United States Patent
Slobodyanyuk et al.

(10) Patent No.: US 11,368,222 B2
(45) Date of Patent: Jun. 21, 2022

(54) DISTRIBUTED AUTOMOTIVE RADAR ARCHITECTURE

(71) Applicant: QUALCOMM Incorporated, San Diego, CA (US)

(72) Inventors: Volodimir Slobodyanyuk, San Diego, CA (US); Michael John Hamilton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 16/689,952

(22) Filed: Nov. 20, 2019

(65) Prior Publication Data

US 2021/0152245 A1 May 20, 2021

(51) Int. Cl.
*H04B 10/25* (2013.01)
*H04L 67/10* (2022.01)
*G01S 13/931* (2020.01)
*G01S 7/00* (2006.01)
*G01S 7/40* (2006.01)
*H04L 7/00* (2006.01)

(52) U.S. Cl.
CPC ........ *H04B 10/25891* (2020.05); *G01S 7/003* (2013.01); *G01S 7/40* (2013.01); *G01S 13/931* (2013.01); *H04L 7/0075* (2013.01); *H04L 67/10* (2013.01)

(58) Field of Classification Search
CPC ..... H04B 10/25891; G01S 7/003; G01S 7/40; G01S 13/931; G06F 9/42; G07C 5/008; B62D 15/028; G08G 1/133; G08G 1/168
See application file for complete search history.

(56) References Cited

U.S. PATENT DOCUMENTS

| 10,081,390 | B1 * | 9/2018 | Anderson | G08G 1/168 |
| 10,820,292 | B1 * | 10/2020 | Peter | H04W 56/004 |
| 2019/0266029 | A1 * | 8/2019 | Sathyanarayana | B60K 35/00 |

* cited by examiner

*Primary Examiner* — Vernal U Brown
(74) *Attorney, Agent, or Firm* — Qualcomm Incorporated

(57) ABSTRACT

Apparatus and methods are disclosed for communicating between distributed automotive sensors, including radar sensors, wherein sensors transmit a synchronization (SYNC) signal, each SYNC signal transmitted via a substantially equal-length fiber optic link corresponding with each sensor. A central node receives the SYNC signals via the fiber optic links corresponding with each of the sensors and determines a master SYNC signal based on the received SYNC signals. The central node then transmits the master SYNC signal via the fiber optic links to the sensors, which receive the master SYNC signal and transmit, via fiber optic link, sensor data synchronized in accordance with the master SYNC signal. The synchronized sensor data are received at the central node and coherently aggregated, and transmitted to a compute node for post-processing. For radar data, the post-processing may include determination of an angular position of an object within detection range of at least two radar sensors.

30 Claims, 8 Drawing Sheets

DISTRIBUTED AUTOMOTIVE RADAR ARCHITECTURE

TECHNICAL FIELD

Disclosed aspects are generally directed to automotive radar, and in particular to aggregating signals from a plurality of radars deployed on an automobile.

BACKGROUND

Automotive environmental sensors play an increasingly important role in many aspects of automotive safety and operation, and have thus become indispensable components of substantially all modern automobiles. In particular, automotive radar sensors can provide critical remote sensing of objects and events near an automobile that may impact safety. A key performance characteristic sought after in many modern automotive radar systems is a capacity to resolve closely spaced objects not only in terms of range relative to the sensing radar, but importantly in angular position as well. Relatively high resolutions in range are conventionally attainable, and contemporary automotive radars are typically able to meet safety requirements. Achieving higher resolution in the angular domain is a more complex task. Typical techniques for achieving sub-degree resolution in radar demand an increase in the size of the antenna array so that conventional digital beamforming may be performed. Angular resolution is proportional to the width of the aperture of the antenna array, which is the distance between the most horizontally separated radar sensors. However, to achieve sub-degree angular resolution on an automobile, an effective antenna array would need to be wider than is practicable on most vehicles. Since automotive radars play a critical role in automotive safety and operation, there is therefore a corresponding need for improved methods and means for finer angular resolution in object detection.

SUMMARY

Aspects of this disclosure are directed to systems and methods for communicating between distributed automotive sensors. An example method may include transmitting, at each sensor of a plurality of sensors, a synchronization (SYNC) signal, each SYNC signal transmitted via a fiber optic link corresponding with each sensor, receiving, at a central node, the SYNC signals via the fiber optic links corresponding with each of the plurality of sensors, determining, at the central node, a master SYNC signal based on the received SYNC signals, transmitting, at the central node, the master SYNC signal via the fiber optic links to the plurality of sensors, receiving, at each sensor, via the fiber optic link, the master SYNC signal, and transmitting, at each sensor, via the corresponding fiber optic link, sensor data synchronized in accordance with the master SYNC signal. Further aspects provide for receiving the synchronized sensor data via the fiber optic links corresponding with each of the plurality of sensors, aggregating the synchronized sensor data, and transmitting the aggregated sensor data. Aspects further provide that the sensors may comprise radar sensors, the sensor data comprise radar sensor data, for receiving, at a compute node, the aggregated radar sensor data, and determining an angular position for at least one object within the detection range of at least two radar sensors of the plurality of radar sensors. In further aspects, each SYNC signal may be generated at each sensor using a voltage controlled oscillator (VCO), determining a master SYNC signal may include arbitrating among the plurality of SYNC signals received from the corresponding plurality of sensors, the fiber optic links may be substantially the same length, and calibrating the fiber optic links at each sensor of the plurality of sensors for effective run length equalization may be performed.

Another aspect is directed to an apparatus for communicating between distributed automotive sensors, which may comprise a central node coupled to a plurality of fiber optic links, the central node including a node transceiver configured to, via the plurality of fiber optic links, receive a plurality of synchronization (SYNC) signals, transmit a master SYNC signal, and receive synchronized sensor data. Included is a processor configured to determine a master SYNC signal based on the received plurality of SYNC signals, and transmit the master SYNC signal. The apparatus may further comprise a plurality of sensors, each sensor coupled to a corresponding fiber optic link of the plurality of fiber optic links, each sensor including a sensor transceiver configured to, via the corresponding fiber optic link, transmit a SYNC signal of the plurality of SYNC signals, receive the master SYNC signal, and transmit sensor data synchronized in accordance with the master SYNC signal.

Further aspects provide for configuring the central node to receive the synchronized sensor data via at least two of the plurality of fiber optic links, aggregate the synchronized sensor data, and transmit the aggregated sensor data, where the plurality of sensors may comprise two or more radar sensors, and the sensor data may be radar sensor data.

The apparatus may further comprise a computing platform configured to receive the aggregated radar sensor data, determine an angular position for at least one object within the detection range of at least two radar sensors of the plurality of radar sensors. Aspects provide also that each SYNC signal may be generated at each sensor using a voltage controlled oscillator (VCO), determining a master SYNC signal may include arbitrating among the plurality of SYNC signals received from the corresponding plurality of sensors, that the fiber optic links of the plurality of fiber optic links may be substantially the same length, the fiber optic links at each sensor of the plurality of sensors may be calibrated for effective run length equalization, that each sensor of the plurality of sensors further may include a fiber optic interface coupled to the corresponding fiber optic link, that the central node may further comprise a fiber optic interface coupled to the plurality of fiber optic links, and that the sensor transceiver may be further configured to transmit and receive configuration and status data.

Another aspect is directed to an apparatus for communicating between distributed automotive sensors, which may comprise means for transmitting, at each sensor of a plurality of sensors, a synchronization (SYNC) signal, each SYNC signal transmitted via a fiber optic link corresponding with each sensor, means for receiving, at a central node, the SYNC signals via the fiber optic links corresponding with each of the plurality of sensors, means for determining, at the central node, a master SYNC signal based on the received SYNC signals, means for transmitting, at the central node, the master SYNC signal via the fiber optic links to the plurality of sensors, means for receiving, at each sensor, via the fiber optic link, the master SYNC signal, and means for transmitting, at each sensor, via the corresponding fiber optic link, synchronized sensor data synchronized in accordance with the master SYNC signal. The apparatus may further comprise, at the central node, means for receiving the synchronized sensor data via the fiber optic links corresponding with each of the plurality of sensors, means for aggregating the synchronized sensor data, and means for transmitting the aggregated sensor data, where the sensors may comprise radar sensors, and the sensor data may comprise radar sensor data. A computing platform may comprise means for receiving the aggregated radar sensor data, and means for determining an angular position for at least one object within the detection range of at least two radar sensors of the plurality of radar sensors.

Further aspects provide that each SYNC signal may be generated at each sensor using voltage controlled oscillator (VCO) means, the means for determining may include means for arbitrating among the plurality of SYNC signals received from the plurality of sensors, the fiber optic link at each sensor of the plurality of sensors may be calibrated for equalization for synchronization of the sensor data.

Another aspect is directed to a non-transitory computer-readable storage medium comprising code, which, when executed by a processor on a central node of a system of distributed automotive sensors, causes an aggregation of synchronized automotive sensor data, the non-transitory computer-readable storage medium comprising code for receiving a plurality of synchronization (SYNC) signals, each SYNC signal received from one of a plurality of sensors, and synchronized sensor data from the plurality of sensors, the sensor data synchronized in accordance with a master SYNC signal, code for determining the master SYNC signal based on the plurality of received SYNC signals, and code for transmitting the master SYNC signal via the plurality of optical links to the plurality of sensors. Aspects provide that the synchronized sensor data may be received via at least two of the plurality of fiber optic links, and for code for aggregating the received synchronized sensor data and transmitting the aggregated sensor data. Further aspects provide that the plurality of sensors may include a plurality of radar sensors, the sensor data are radar sensor data, each SYNC signal of the plurality of SYNC signals is generated at each corresponding sensor using a voltage controlled oscillator (VCO), that the code for determining a master SYNC signal may further comprise code for arbitrating among the plurality of SYNC signals received from the plurality of sensors; for code for transmitting and receiving configuration data and status data.

BRIEF DESCRIPTION OF THE DRAWINGS

A more complete appreciation of the various aspects described herein and many attendant advantages thereof will be readily obtained as the same become better understood by reference to the following detailed description when considered in connection with the accompanying drawings, which are presented solely for illustration and not limitation, and in which.

DETAILED DESCRIPTION

Figure 1:
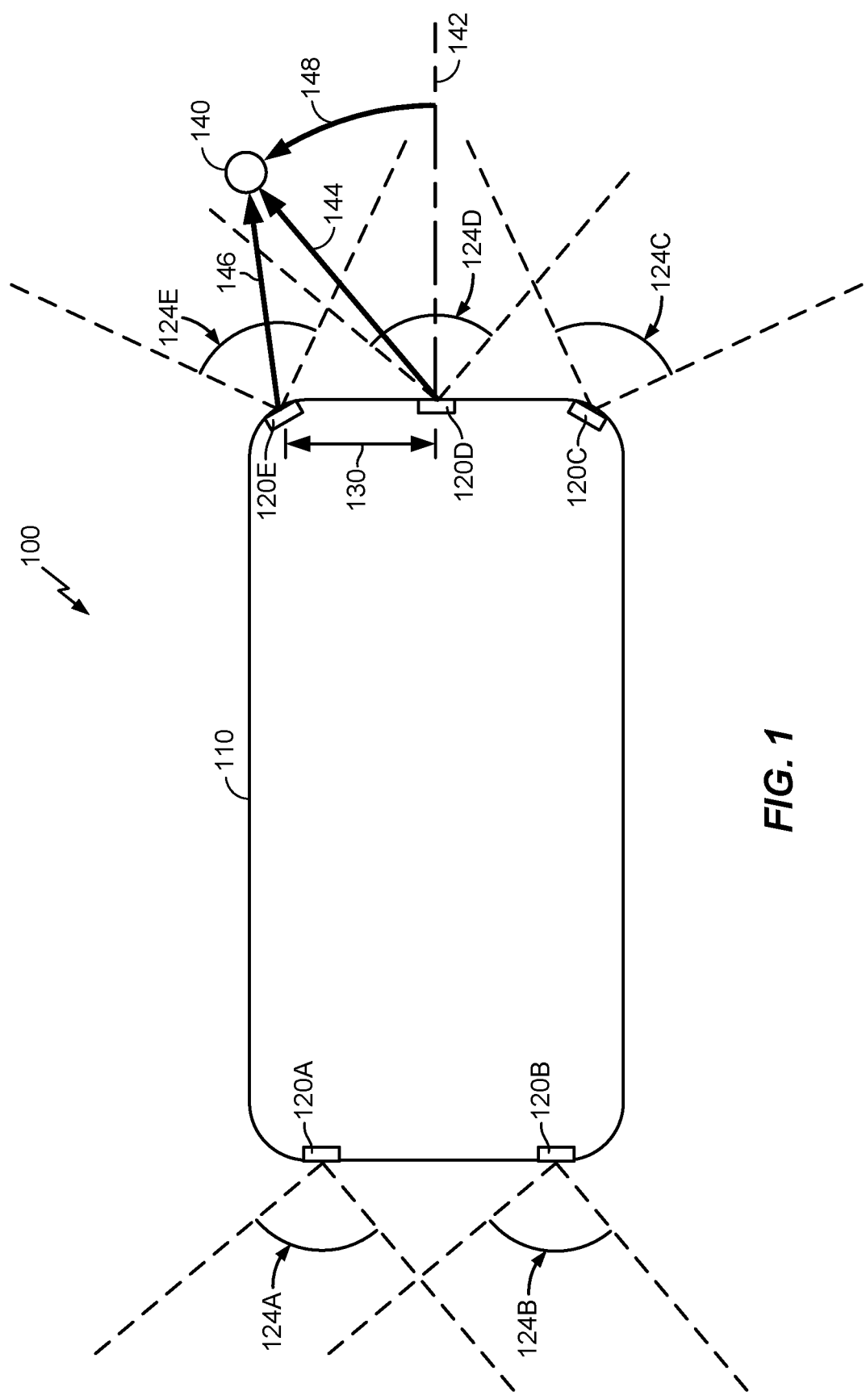
FIG. 1 depicts an example distribution of sensors on a vehicle.

Aspects disclosed herein are directed to achieving finer angular target resolution in automotive radars. Example motivations for implementing radar systems capable of sub-degree angular resolution have arisen with increasingly stringent requirements to accurately locate objects (e.g., person, vehicle, motorcycle, structure, etc.) in the near-field of an automobile. Indeed, simple driver awareness, and control systems for partially and/or fully autonomous automobiles, both call for detailed 360-degree views, for example, to perceive closely spaced objects disposed about the automobile.

These and other aspects are disclosed in the following description and related drawings to show specific examples relating to exemplary aspects. Alternative aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "automobile" and "vehicle," and any variants thereof, may interchangeably refer to any automotive vehicle, including self-driving, autonomous, driverless, robotic, semi-autonomous, and conventional driver-controlled automotive vehicles.

As mentioned above, conventional radars are adept at resolving ranges (herein also, "radial ranges"), but are much less effective for resolving object positions in terms of angular bearing (herein also, "azimuth"). Angular resolution is a function of the effective aperture of the radar, which is essentially the width of the antenna array. Sub-degree angular resolution for automobiles, in particular, would require sensors with an aperture on the order of 30 centimeters (cm), and radar sensors of that size are not practicable for implementation on a typical automobile.

Modern automobiles—vehicles, more generally—are already typically equipped with multiple radar sensors. For example, there may be two sensors in the front and three in the rear. Aspects disclosed herein provide for joining a multiple of these radar sensors in a network, and processing data collected by them in a coherent manner. An important benefit of this arrangement lies in the physical separations between the radar sensors already conventionally deployed on the automobile. That is, the separations can be relatively large, constrained only by the physical dimensions and shape of the vehicle, and can therefore yield significantly improved angular resolution when operated coherently.

According to embodiments disclosed herein, processing of the data streams from such physically separated radar sensors requires that the data streams from the individual sensors be synchronized. The radar sensors may be driven by a signal provided by centralized synchronizing means, for example, such that voltage-controlled oscillators (VCOs) at each sensor may be synchronized. Distribution of a master synchronization signal to the individual radar sensors may then allow them to transmit and receive their respective signals in lockstep, thus facilitating coherent combinations of the signals received from the units.

Distributing a centrally generated synchronization signal between physically remote automotive sensors may be a challenging task, however, due to a number of factors. The electro-magnetic environment in many vehicles may be adversely affected by various relatively powerful broadband high-frequency noise sources, including, for example, sparks generated by internal combustion engine ignition system, GPS radio frequency (RF) sub-systems, USB cables, etc. Given that the lengths of the cables required for communication of the synchronization signals between the various radar units is significant, these noise sources may well contaminate a synchronization signal and degrade its quality. Further, since the operating frequency of most automotive radars is approximately 80 GHz, the attenuation of this signal may be significant simply due to the lengths of the cables, thus adding to the degradation of quality of synchronized signaling. Moreover, the costs of cables capable of transmitting a signal at ~80 GHz frequency may be quite high. Some of these concerns may be ameliorated somewhat by the use of frequency division/multiplication methods, such as those in which the actual frequency of the transmitted signals is down-converted to a less challenging frequency range. However, it is still likely that additional errors will be incurred when subsequently up-sampling the signal. There are therefore many difficult circumstances to overcome to realize coherent processing of high frequency sensor data in an automotive environment.

Aspects disclosed herein provide for methods and means for distributing various signals of interest between multiple sensors in ways that address the difficulties discussed above. A key component of the solution is the use of a fiber optic communication link, which is used to join the sensors on the vehicle into a synchronous network. A fiber optic link offers significant advantages for use in the automotive environment, including, at least, immunity to electromagnetic noise, low cost, and stable operation in varied and variable environmental conditions. Further, fiber optic cables may be manufactured to very precise specifications, thus enabling accurate, equalized cable run lengths aiding synchronization of signals over a plurality of fiber optic cables. Further, data throughput is adequate for the uses described herein. While automotive radar implementations are a focus herein, it is also contemplated that processing related to other types of automotive sensors, such as those for generating LIDAR, video, global navigation satellite system (GNSS), and inertial measuring unit (IMU) data, using conventional communication busses, may benefit from the many advantages gained by the use of fiber optic links for data communication.

FIG. 1 depicts an example distribution 100 of sensors on a vehicle 110. As shown, a vehicle 110 is equipped with a number of sensors 120A-E disposed on its exterior. Two sensors 120 A, B may be mounted on the front of the vehicle 110, and three sensors 120C-E mounted on the rear. Each sensor 120A-E has an example corresponding angular sensitivity range 124A-E, within which it is expected a range to an object may be detected. As an example, object 140 is depicted to be at a first range 144 in the angular sensitivity range 124D of sensor 120D, and at a second range 146 in the angular sensitivity range 124E of sensor 120E. Given an aperture 130, i.e., the distance between sensor 124D and sensor 124E, it is contemplated that an angular position 148 of the object 140 with respect to a datum 142 (arbitrarily positioned in FIG. 1) may be determined in accordance with various methods, based on timing information for sensor returns at sensor 120D and sensor 120E. However, as discussed above, the sensor data must be substantially perfectly synchronized to perform such a positioning determination, and typical, conventional network and communication systems deployed in modern vehicles lack adequate facilities to accommodate the required synchronization of data flows. Methods and apparatus disclosed herein are directed toward satisfying these stringent communication requirements for automotive sensor systems, and in particular, for conventionally deployed automotive radar sensors.

Figure 2:
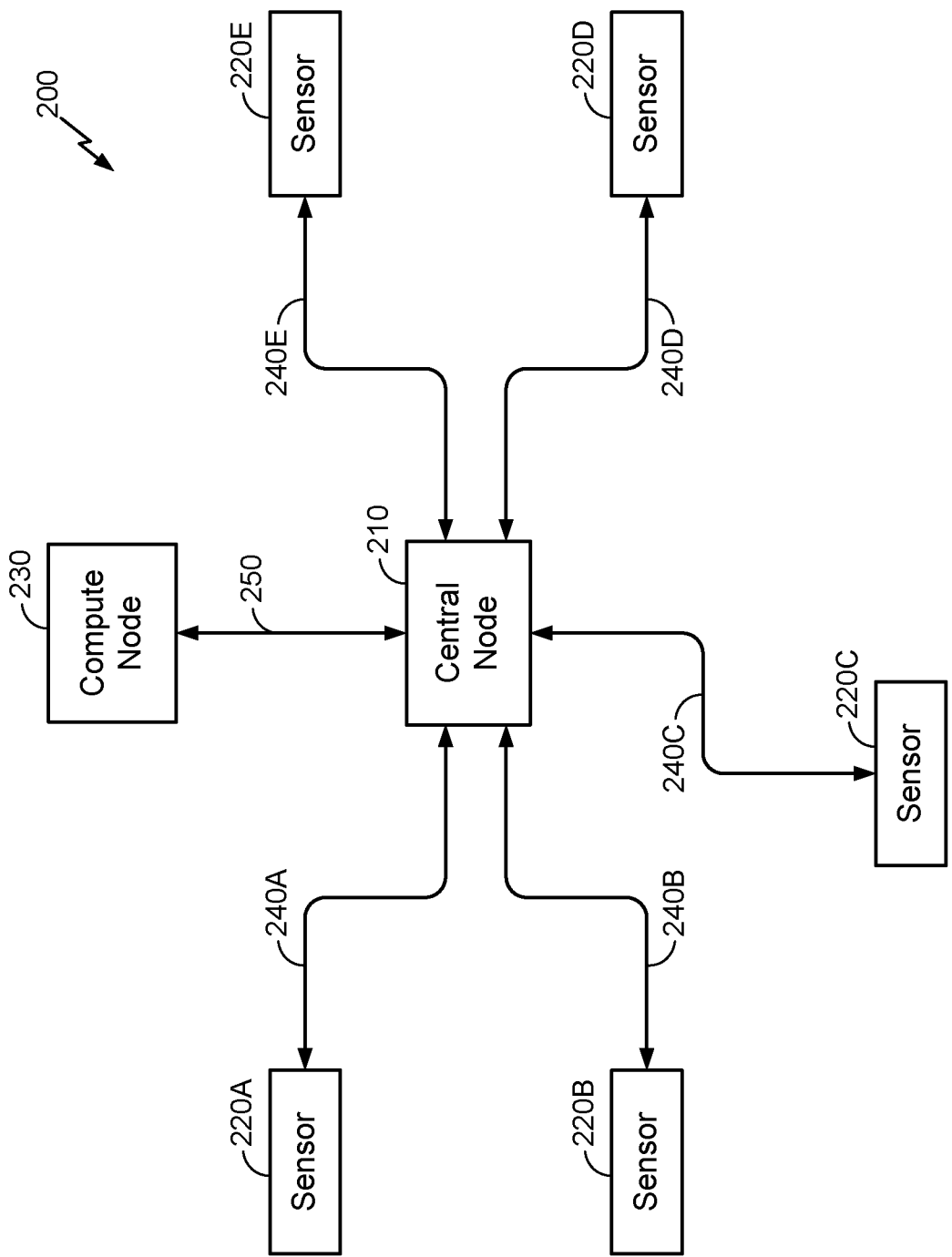
FIG. 2 illustrates an example distributed automotive sensor system layout.

FIG. 2 illustrates an example of a distributed automotive sensor system layout 200. A central node 210 may be coupled to a plurality of fiber optic links 240A-E. The same fiber optic links 240A-E may be coupled at their other extremities with sensors 220A-E, thus facilitating a communicative coupling at the central node 210 with the sensors 220A-E. In various embodiments, the sensors 220A-E comprise at least two automotive radar sensors, which may correspond with any or all of sensors 120A-E shown in FIG. 1.

According to other aspects, the fiber optic links 240A-E are fiber optic cables with equal run lengths. Optical cables with such equal run lengths may be manufactured to close tolerances, and are advantageous in that synchronization of the data flows carried by the fiber optic links 240A-E is simplified. That is, the optical travel distances are substantially the same for transmissions over each of the fiber optic links 240A-E. It is contemplated that a calibration may be imposed if needed, however, to fine tune discrepancies in the run lengths. According to further aspects, the run lengths of the fiber optic links 240A-E may be unequal, in which case a calibration may be implemented to effectively equalize the link run lengths. As discussed above, the fiber optic links 240A-E offer advantageously improved data flows at rates high enough to accommodate signal transmissions at ~80 GHz frequencies of automotive radars, in particular, without being affected by EMI inherent to automotive environments. While a focus is herein on automotive radar implementations, it is contemplated also that processing related to other types of automotive sensors may benefit from the advantages gained by the use of fiber optic links for data communication. Example additional sensor types may include, but are not limited to, those for generating LIDAR, video, global navigation satellite system (GNSS), and inertial measuring unit (IMU) data.

The central node 230 may also be communicatively coupled to compute node 210. In a general sense, the central node 230 may orchestrate the distribution of signals between the various network components, and aggregate and transmit sensor data for post-processing at a compute node 230. The sensors 220A-E may also receive various communications, including information regarding sensor configuration and transmission timing, from the compute node 230, and distributed by the central node 210.

In various aspects, each sensor 220A-E may transmit a synchronization (SYNC) signal to the central node 230, which thus receives a plurality of SYNC signals corresponding to the plurality of sensors 220A-E. The central node 230 may be configured to arbitrate among the plurality of received SYNC signals and determine a master SYNC signal. According to an aspect, a received SYNC signal at or above a threshold level of quality may be selected for use as the master SYNC signal. The master SYNC signal may be alternatively, or additionally, synthesized from some or all of the plurality of received SYNC signals. In an embodiment, a SYNC signal is generated at each sensor 220A-E as an analog signal, and processing the received SYNC signals at the central node 230 is performed in the analog signal domain. The central node 210 may be further configured to transmit the master SYNC signal via the fiber optic to the sensors 220A-E, where at each sensor, sensor data are synchronized in accordance with the master SYNC signal and transmitted, in synchronization, to the central node 210 via a corresponding fiber optic link 220A-E.

It will be understood that five sensors (A-E) are depicted in FIG. 2 for ease of explanation and depiction, and that more, or fewer, sensors may be actually implemented. Further, according to aspects, a subset of the plurality of sensors 220A-E may be selected for operation. For example, where the sensors 220A-E are automotive radar sensors, sensors A, B positioned at the front of a vehicle 110 may be selected for sensing operations. In such a scenario, the central node 210 may receive SYNC signals from sensors 220A, B and transmit to those a master SYNC signal, after which the central node 210 may receive synchronized sensor data from sensors 220A, B.

Referring back to FIG. 1, it will be appreciated that the distribution 100 of sensors on the vehicle 110, as illustrated, may be but one of many ways to distribute and implement sensors 120. In an embodiment (not shown), a sensor distribution 100 may be used to implement synthetic aperture radar (SAR). In a conventional arrangement, as deployed on a platform such as an aircraft, an SAR operates by moving a radar over a stationary scene. Samples are taken at intervals, which are integrated to simulate the results of a larger base antenna. That is, because the aircraft is moving, the base of the measurements may be effectively extended by the corresponding change in the position of the antenna. Angular resolution of the radar may therefore be improved, as well.

By contrast, a network of fiber optic links 240 as described above may be implemented for an SAR system on a vehicle 110, or any other moving platform. The multiple sensors 120 may be distributed about the vehicle 110 and connected via fiber optic links 240, realizing significantly improved data flows. The sensors 120 and network of fiber optic links 240 may then be configured for acquisition of instantaneous measurements, simultaneously, in multiple locations in space due to motion of the vehicle 110. The data from the multiple sensors 120 may then be coherently processed and integrated into a high resolution image of the surrounding space. As will be appreciated, this kind of advanced automotive radar processing is feasible due to leveraging the high bandwidth of the fiber optic network linking the radar sensors, as described herein.

Figure 3:
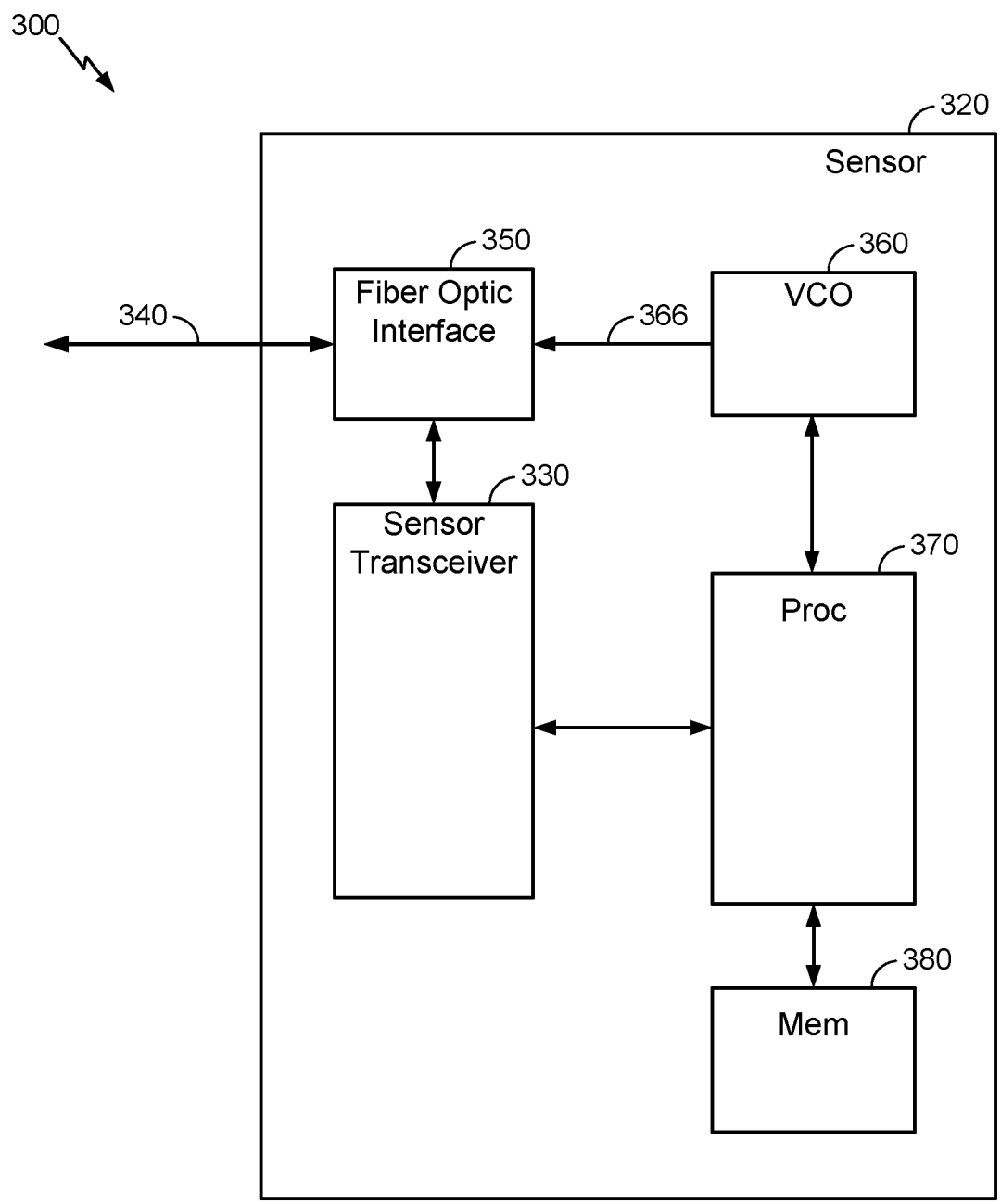
FIG. 3 is a functional block diagram illustrating an example automotive sensor apparatus according to aspects disclosed herein.

FIG. 3 is a functional block diagram illustrating an example automotive sensor apparatus 300 according to aspects disclosed herein. For ease of disclosure, the sensor 320 as depicted in FIG. 3 may be regarded substantially as any of sensors 220A-E, shown in FIG. 2 and discussed in the foregoing.

A sensor 320 may include a means for transmitting and receiving, that is, a sensor transceiver 330, fiber optic link 340, fiber optic interface (or adapter) 350, a synchronization means, comprising a voltage controlled oscillator (VCO) 360, processor 370, and memory 380. It should be understood that the fiber optic link 340 may be equivalent to any of the fiber optic links 240A-E, shown in FIG. 2 and discussed in the foregoing. The memory 380 is coupled to the processor and generally used for storing instructions and/or data.

In an embodiment, the sensor transceiver 330 is functionally coupled with the fiber optic link 340 via the fiber optic interface 350. Aspects provide that the sensor transceiver 330 may transmit a SYNC signal via the fiber optic interface 350, via the fiber optic link 340. The sensor transceiver may in turn receive a master SYNC signal, again via the fiber optic link 340 and the fiber optic interface 350. The processor 370 may be configured to generate, based on the master SYNC signal, synchronized sensor data.

In more detail, the VCO 360 may be configured to generate the SYNC signal at the sensor 320. In an aspect, a VCO signal may be supplied to the fiber optic interface 350 (e.g., an electro-optical modem) via a VCO tap 366, and multiplexed into an optical SYNC signal. That SYNC signal may then be transmitted over the fiber optic link 340, as described, to a central node 210 (see FIG. 2). At the central node 210, multiple SYNC signals may be received, in addition to the SYNC signal from the sensor 320, from which the central node 210 generates a master SYNC signal. The master SYNC is transmitted to the sensor 320 via the fiber optic link 340, where it is received via the fiber optic interface 350. The VCO 360 may be configured to then generate a VCO signal in accordance with the SYNC master. The processor 370 generates sensor data, as sensed by the sensor 320, for transmission. At the fiber optic interface 350, the VCO signal may be received via the VCO tap 366, and used to multiplex the optical signal in which the sensor data are transmitted over the fiber optic link 340.

The sensor 320 may also receive various configuration and status data, including sensor configuration and transmission timing. The various configuration data may be received from a compute node 230, distributed by a central node 210.

Figure 4:
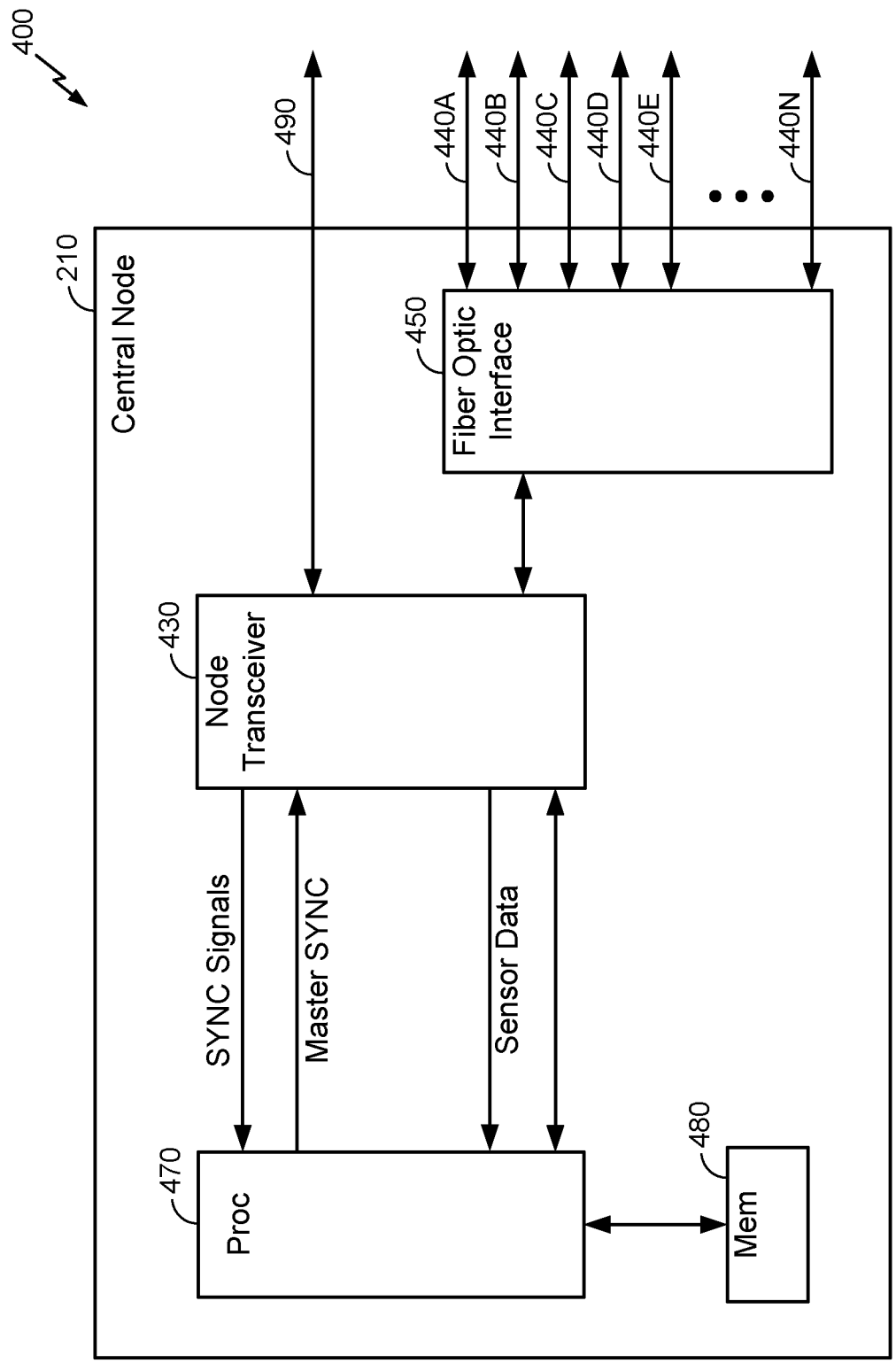
FIG. 4 is a functional block diagram illustrating an example central node apparatus according to aspects disclosed herein.

FIG. 4 is a functional block diagram illustrating an example central node apparatus 400 according to aspects disclosed herein. In an embodiment, the central node 210, also shown in FIG. 2, may be regarded as a central hub of a star network comprising peripheral components such as sensors 220A-E. The central node 210 may operate in both the analog and digital domains. In the analog domain, the central node 210 is responsible for arbitrating the qualities of SYNC signals received from sensors 220A-E, and establishing a master role such that the central node 210 has unidirectional control over certain of the sensor data transmission characteristics of the sensors 220A-E. The central node 210 operates in the digital domain as primarily responsible for switching communication between a compute node 230 and the various sensors 220A-E, individually.

A fiber optic interface (or adapter) 450 is coupled with a plurality of fiber optic links 440A-440N, where N is an arbitrary number. For ease of disclosure, fiber optic links 440A-440E may correspond with sensors 220A-E, for example. A node transceiver 430 may be coupled to the fiber optic interface 450 and a processor 470, thus effecting a functional coupling between the processor 470 and fiber optic interface 450. The node transceiver 430 may also be coupled to a network access 492. The processor 470 may also be coupled with a memory 480, for storing data and instructions, for example.

As discussed, a plurality of SYNC signals, from a corresponding plurality of sensors, may be received at the fiber optic interface 450 over fiber optic links 440A-N. In an embodiment, the SYNC signals are routed to the processor 470 as shown. The processor 470 determines a master SYNC signal by arbitrating among the plurality of received SYNC signals. According to an aspect, a best suited SYNC signal may be selected from the plurality of received SYNC signals to be the master SYNC. Qualities of the SYNC signals that are compared may include, but are not limited to, waveform consistencies and/or noise levels. As discussed above, threshold levels may be identified for selection of a master SYNC from the plurality of SYNC signals. In another aspect, a master SYNC may be synthesized from among the SYNC signals. The master SYNC signal may be sent back through the node transceiver 430 and fiber optic interface 450 for transmission over the plurality of fiber optic links 440A-N. According to an aspect, the master SYNC is transmitted only over links over which a SYNC signal was received. That is, for example, if SYNC signals were received from sensors 220A-E over fiber optic links 440A-E, then the master SYNC is transmitted back over fiber optic links 440A-E. As mentioned above, any subset of the plurality of sensors 220A-E, and consequently fiber optic links 440A-E, may be active in a particular application or instance. According to an aspect, the master SYNC may be broadcast to all components linked to the central node, for use, or not, accordingly at those components.

The sensors 220A-E transmit sensor data synchronized at the sensors in accordance with the master SYNC. The synchronized sensor data are received over the corresponding fiber optic links 440A-E. The synchronized sensor data are routed to the processor 470, which coherently aggregates the sensor data for subsequent processing. In particular, the aggregated sensor data may be derived from radar sensor data, and processed at the compute node to exploit the coherency between data flows to generate determinations of angular position of one or more objects within the field of sensitivity of radar sensors 220A-E. In an embodiment, the aggregated sensor data are transmitted to a computing platform, such as compute node 230 shown in FIG. 1, and discussed in more detail below with regard to FIG. 5. In an embodiment, the aggregated sensor data may be transmitted to the compute node 230 via a fiber optic link, such as one of the fiber optic links 440A-N which are not also allocated for communication with a sensor 220A-E. In another embodiment, the aggregated sensor data may be transmitted to the compute node 230 via a network link 490, such as may be coupled to the node transceiver 430.

As mentioned, according to various aspects, the optical cables carrying fiber optic links 440A-N may have substantially equal run lengths, thus preserving the synchronization established at the sensors 220A-E using the master SYNC. Should a calibration be required to tune the synchronization of the sensor data received via the fiber optic links 440A-N, aspects provide that it may be performed at the processor 470. In another embodiment, the optical cable run lengths may not be substantially equal. In that case, a calibration may be similarly performed at the processor 470.

Figure 5:
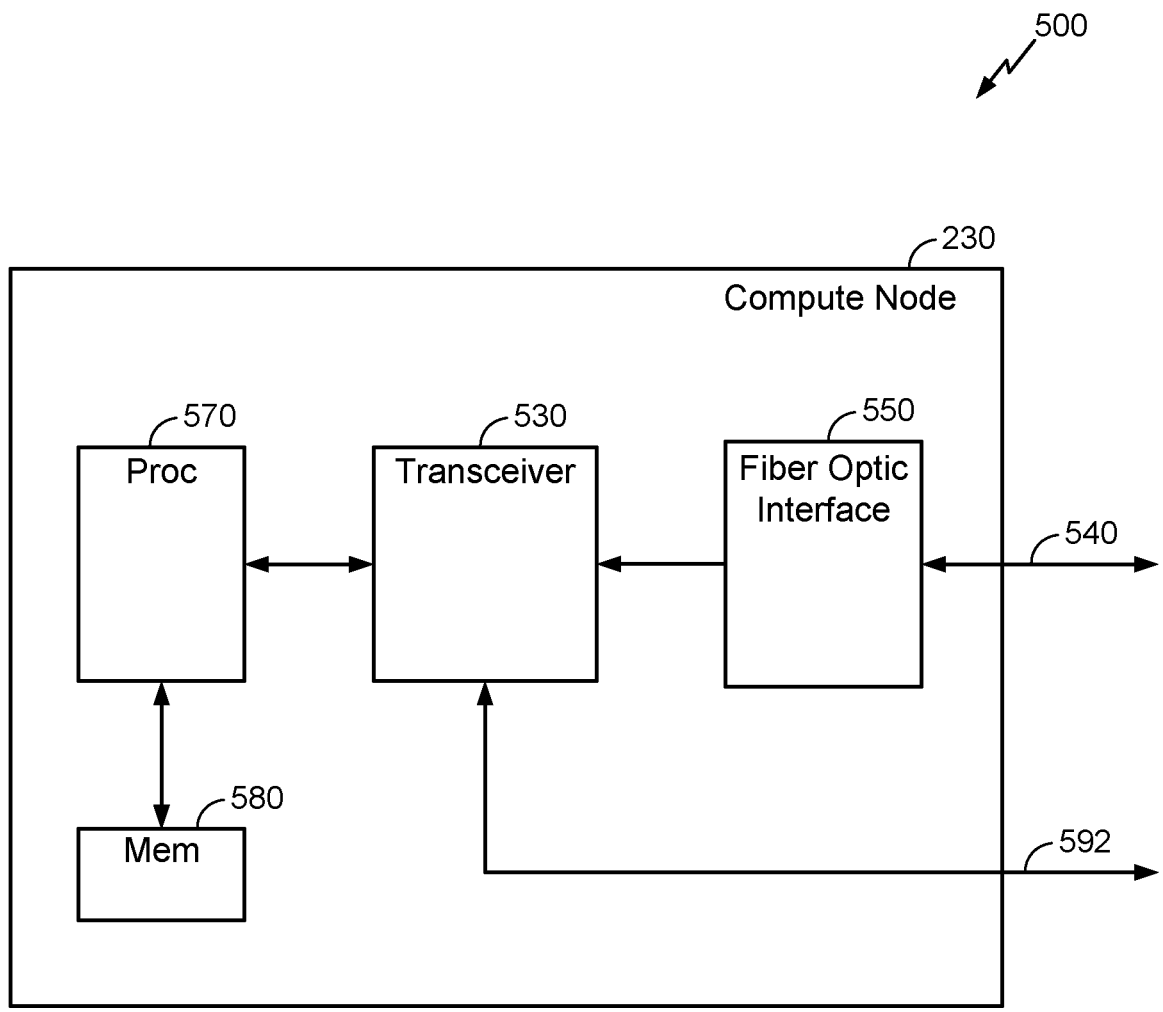
FIG. 5 is a functional block diagram of an example computing platform apparatus according to aspects disclosed herein.

FIG. 5 is a functional block diagram of an example computing platform apparatus 500 according to aspects disclosed herein. According with various aspects, the computing platform 500 may be part of an advanced driver-assistance system (ADAS), conventionally implemented in vehicles to aid in automobile and road safety. The compute node 230 comprises a fiber optic interface 550, which may be coupled to a compute node transceiver 530, in turn coupled with a processor 570. The processor 570 may in turn be coupled with a memory 580. The compute node 230 may receive, via a fiber optic link 540, aggregated sensor data such as that generated at a central node 210. In various embodiments, such aggregated sensor data is routed to the processor 570 for post-processing. As mentioned above, where the sensors 240A-E include at least two automotive radar sensors, it may be useful to determine angular positions of objects with the sensing ranges of some, or all, of the available radar sensors. The processor 570 may be configured to perform computations using the aggregated sensor data to generate such angular position determinations. As described above with regard to FIG. 1, it will be appreciated that there are various methods for locating a radar-reflective target using two or more sensors, but that a key characteristic of the radar data is that the data be coherent, or time-aligned, as is made possible through the use of communication means such as fiber optic links 240A-E, 440A-E, as described herein. In the case of object detection and angular location using automotive radar data, the compute node 230 may communicate the computed determinations via a conventional network link 592 with other components of the vehicle 110, such as for displaying to the driver. In an embodiment, the computed determinations may be transmitted via the fiber optic link 540, depending upon the network architecture of the vehicle.

Figure 6:
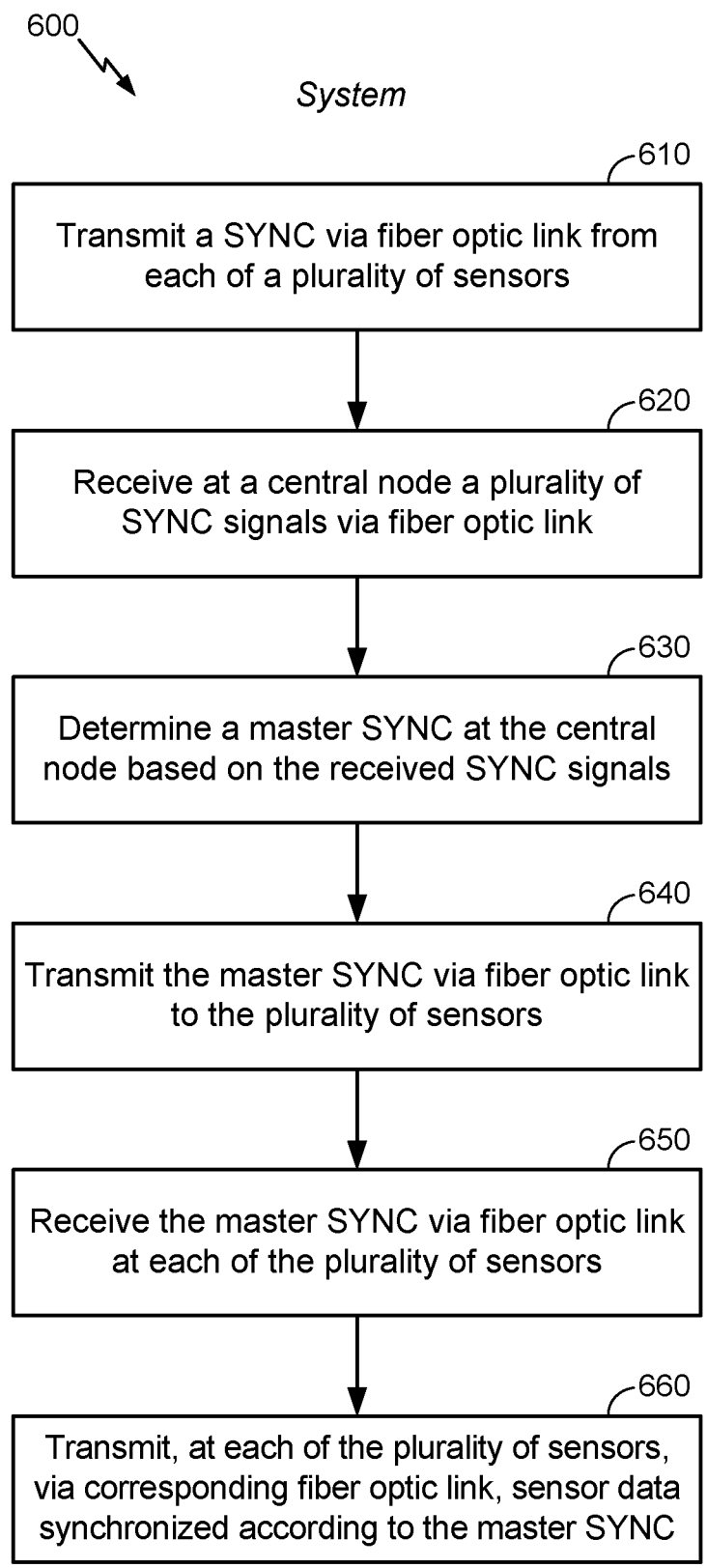
FIG. 6 is a flowchart depicting a method of communicating between distributed automotive sensors according to aspects disclosed herein.

FIG. 6 is a flowchart depicting a method of communicating 600 between distributed automotive sensors, according to aspects disclosed herein. The method may be performed by system of components, including a plurality sensors, such as any or all of sensors 220A-E, 320, and a central node, such as central node 210, which is communicatively linked to the plurality of sensors via fiber optic links, such as fiber optic links 240A-E, 440A-E.

At 610, a SYNC signal may be transmitted by each sensor of the plurality of sensors via a corresponding fiber optic link. In an embodiment, the SYNC signal from each sensor may be a VCO signal generated at the sensor. At 620, a central node receives via the fiber optics links with the plurality of sensors, the plurality of SYNC signals so transmitted. According to an aspect, the number of responding sensors, and consequently the number of received SYNC signals, may be a subset of some totality of sensors. That is, operationally, the plurality of sensors described may represent a portion of some total number of sensors.

At 630, the central node may derive a master SYNC from the plurality of received SYNC signals. According to an aspect, the master SYNC signal may be determined by arbitrating among the plurality of received SYNC signals. Accordingly, a best suited SYNC signal may be selected from the plurality of received SYNC signals to be the master SYNC. Qualities of the SYNC signals that inform arbitration may include, but are not limited to, waveform consistencies and/or noise levels. In another aspect, the master SYNC may be synthesized from among the received SYNC signals.

At 640, the master SYNC may be transmitted to the plurality of sensors via the corresponding fiber optic links. As mentioned, the plurality of sensors may be a subset of some total number of sensors. In that case, the master SYNC may be transmitted only to the responding plurality of sensors via corresponding fiber optic links. According with another aspect, the master SYNC may be broadcast to all sensors and components linked to the central node, for use, or not, accordingly at those components. At 650, at each sensor of the plurality of sensors, the master SYNC is received via corresponding fiber optic link. At 660, each sensor of the plurality of sensors transmits, via its corresponding fiber optic link, sensor data that has been synchronized in accordance with the master SYNC.

According to further aspects, the synchronized sensor data are received at the central node via the fiber optic links corresponding with each of the plurality of sensors, and the synchronized sensor data are aggregated and transmitted. In an embodiment, the plurality of sensors includes automotive radar sensors, and the sensor data from the plurality of sensors comprise radar sensor data.

According to other aspects, the aggregated radar sensor data are received at a computing platform, and an angular position is determined for at least one object within the detection range of at least two radar sensors of the plurality of radar sensors. Also, the SYNC signals received at the central node may each be generated at each individual sensor using a voltage controlled oscillator (VCO) at the sensor. Further, determination at the central node of the master SYNC may include arbitrating among the plurality of SYNC signals received from the corresponding plurality of sensors.

Additional aspects provide that the plurality of fiber optic links may be substantially the same length, and for calibration of the fiber optic links corresponding with each sensor of the plurality of sensors for effective link run length equalization. That is, the calibration provides that the link run lengths are made substantially equal in an effective sense when they may physically not be substantially equal.

Figure 7:
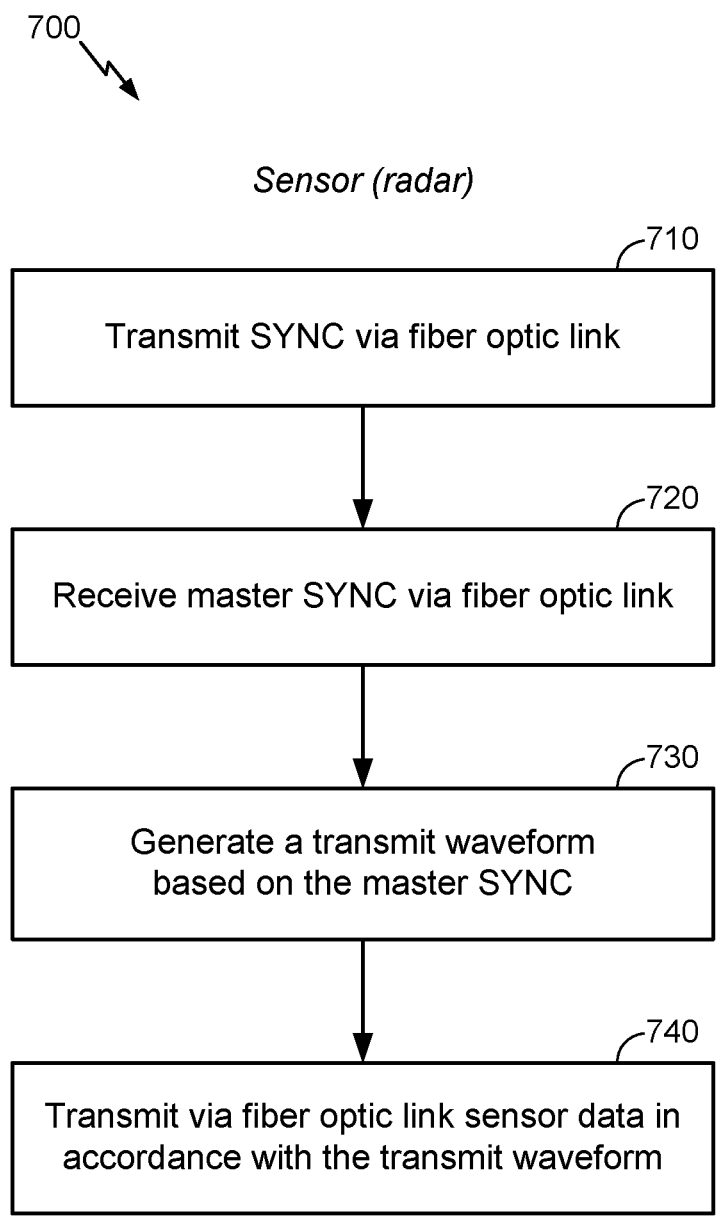
FIG. 7 is a flowchart depicting a method of communicating, at an automotive sensor, in a distributed automotive sensor architecture according to aspects disclosed herein.

FIG. 7 is a flowchart depicting a method of communicating 700, at an automotive sensor, in a distributed automotive sensor architecture according to aspects disclosed herein. At 710, at an automotive sensor, a SYNC signal is transmitted via a fiber optic link. Aspects provide that the SYNC signal may be transmitted to a central node 210. In an embodiment, the SYNC signal at the sensor may be a VCO signal generated by a VCO at the sensor. At 720, a master SYNC is received via the fiber optic link at the sensor. At 730, a transmit waveform is generated at the sensor in accordance with the master SYNC. As described above with respect to FIG. 3, a VCO at the sensor may be configured to generate a VCO signal (i.e., transmit waveform) consistent with the master SYNC. At 740, sensor data at the sensor are transmitted via the corresponding fiber optic link. According to an aspect, the transmit waveform is used to multiplex the optical signal in which the sensor data are transmitted via the fiber optic link. Aspects also provide that the sensor data are transmitted to the central node 210.

According to some aspects, the sensor is an automotive radar sensor. Further, fiber optic link is of a predetermined run length that is common among a plurality of fiber optic links connected to other sensors. In addition, configuration and status data comprising information such as sensor configuration and transmission timing may be received over the fiber optic link.

Figure 8:
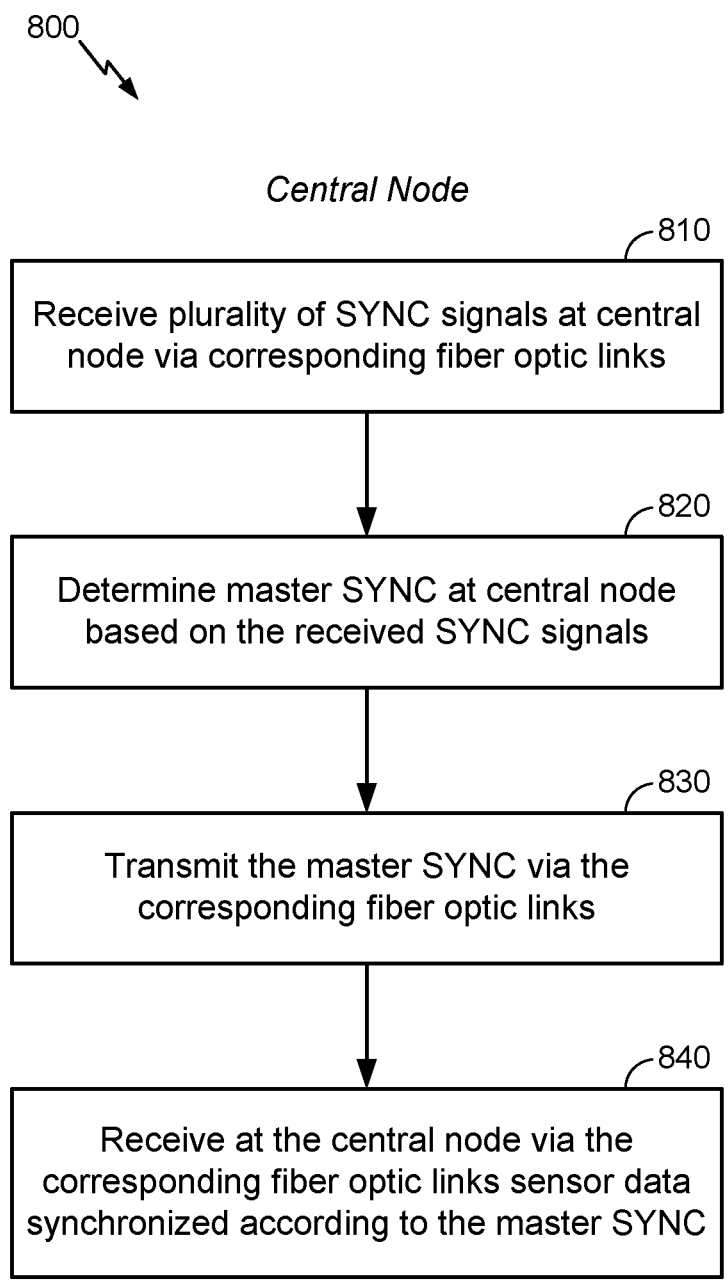
FIG. 8 is a flowchart depicting a method of communicating, at central node, between distributed automotive sensors according to aspects disclosed herein.

FIG. 8 is a flowchart depicting a method of communicating 800, at a central node, such as central node 230, between distributed automotive sensors, such as sensors 220A-E, 320, according to aspects disclosed herein. At 810, a plurality of SYNC signals are received at the central node via a plurality of corresponding fiber optic links. At 820, a master SYNC may be determined at the central node based on the received plurality of SYNC signals. As mentioned, the master SYNC signal may be determined by arbitrating among the plurality of received SYNC signals. Accordingly, a best suited SYNC signal may be selected from the plurality of received SYNC signals to be the master SYNC. Qualities of the SYNC signals that inform arbitration may include, but are not limited to, waveform consistencies and/or noise levels. According to an aspect, the master SYNC may be synthesized from among the received SYNC signals. At 830, the master SYNC may be transmitted via the plurality of corresponding fiber optic links. At 840, sensor data synchronized according to the master SYNC are received at the central node via the plurality of fiber optic links. That is, flows of sensor data received via each of the plurality of fiber optic links are synchronized in accordance with the master SYNC.

Aspects provide for aggregation of the synchronized sensor data, with subsequent transmission of the aggregated data to a compute node. Further, the sensor data may comprise radar sensor data, with the synchronized sensor data comprising synchronized radar data.

Further aspects provide that each SYNC signal of the received plurality of SYNC signals is the product of a voltage controlled oscillator (VCO) at each corresponding with each SYNC signal, and determining the master SYNC signal may include arbitrating among the plurality of SYNC signals.

According with other aspects, run lengths for the fiber optic links may all be substantially the same, though a calibration may be performed with regard to the plurality of fiber optic links for effective link run length equalization. In addition, configuration and status data comprising information such as sensor configuration and transmission timing may be transmitted and received over the plurality of fiber optic links.

Aspects further provide for an automotive sensor, comprising a transceiver, coupled to a fiber optic link, where the transceiver is configured to transmit, via the fiber optic link, a synchronization (SYNC) signal and synchronized sensor data, and receive, via the fiber optic link, a master SYNC signal, and a processor configured to generate, based on the master SYNC signal, the synchronized sensor data. According to other aspects, regarding the automotive sensor, the SYNC signal and the synchronized sensor data are transmitted, via the fiber optic link, to a central node, the automotive sensor comprises an automotive radar sensor, and further comprises a voltage controlled oscillator (VCO) for generating the SYNC signal. Further regarding the automotive sensor, the fiber optic link is of a predetermined common length, and the fiber optic link may be calibrated for effective run length equalization. The automotive sensor may further comprise a fiber optic interface coupled with the fiber optic link. The automotive sensor transceiver may be further configured to transmit and receive configuration data and status data.

Embodiments include a method of synchronizing automotive radar sensors, comprising transmitting, at each radar sensor of a plurality of radar sensors, a synchronization (SYNC) signal, each SYNC signal transmitted via a fiber optic link corresponding with each respective radar sensor, receiving, at each radar sensor, via the fiber optic link, a master SYNC signal determined on the basis of the SYNC signals transmitted by the plurality of radar sensors, generating, at each radar sensor, a transmit waveform based on the master SYNC signal, and transmitting, at each radar sensor, via the fiber optic link, radar data using the transmit waveform.

Aspects further provide for a central node comprising a processor configured to determine a master SYNC signal based on a plurality of received SYNC signals, and a node transceiver, functionally coupled to a plurality of fiber optic links, where the node transceiver is configured to receive the plurality of synchronization (SYNC) signals, each SYNC signal received from one of a plurality of sensors, transmit a master SYNC signal via the plurality of optical links to the plurality of sensors, and receive synchronized sensor data from the plurality of sensors, the synchronized sensor data synchronized in accordance with a master SYNC signal. Regarding the central node, the synchronized sensor data may be received via at least two of the plurality of fiber optic links, the processor is further configured to aggregate the synchronized sensor data, the transmitter is further configured to transmit the aggregated sensor data, the plurality of sensors includes a two or more automotive radar sensors, and the synchronized sensor data are synchronized radar sensor data, each SYNC signal is generated using a voltage controlled oscillator (VCO) at each corresponding sensor, determining the master SYNC signal includes arbitrating among the plurality of SYNC signals received from the corresponding plurality of sensors. Further regarding the central node, the fiber optic links of the plurality of fiber optic links may be substantially the same length, and may be calibrated for effective link run length equalization. The central node may further comprise a fiber optic interface coupled to the plurality of fiber optic links, and the transceiver may be further configured to transmit and receive configuration data and status data.

Embodiments further include a method of synchronizing automotive radar sensors, comprising receiving, at a central node, a plurality of synchronization (SYNC) signals, each SYNC signal received via a fiber optic link corresponding with one of a plurality of respective radar sensors, determining, at the central node, a master SYNC signal based on the plurality of received SYNC signals, transmitting, at the central node, the master SYNC signal via the plurality of fiber optic lines to the plurality of radar sensors, and receiving, at the central node, via the plurality of fiber optic links, radar data from the plurality of radar sensors, radar data from the plurality of radar sensors, the radar data synchronized in accordance with the master SYNC signal.

Those having skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those having skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art.

An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

According to one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of communicating between distributed automotive sensors, comprising:
   transmitting, at each sensor of a plurality of sensors, a synchronization (SYNC) signal, each SYNC signal transmitted via a fiber optic link corresponding with each sensor;
   receiving, at a central node, the SYNC signals via the fiber optic links corresponding with each of the plurality of sensors;
   determining, at the central node, a master SYNC signal based on the received SYNC signals;
   transmitting, at the central node, the master SYNC signal via the fiber optic links to the plurality of sensors;
   receiving, at each sensor, via the fiber optic link, the master SYNC signal; and
   transmitting, at each sensor, via the corresponding fiber optic link, sensor data synchronized in accordance with the master SYNC signal.

2. The method of claim 1, further comprising, at the central node:
   receiving the synchronized sensor data via the fiber optic links corresponding with each of the plurality of sensors;
   aggregating the synchronized sensor data; and
   transmitting the aggregated sensor data.

3. The method of claim 2, wherein the sensors comprise radar sensors, and the sensor data comprise radar sensor data.

4. The method of claim 3, further comprising:
   receiving, at a compute node, the aggregated radar sensor data; and
   determining an angular position for at least one object within the detection range of at least two radar sensors of the plurality of radar sensors.

5. The method of claim 1, wherein each SYNC signal is generated at each sensor using a voltage controlled oscillator (VCO).

6. The method of claim 1, wherein said determining a master SYNC signal includes arbitrating among the plurality of SYNC signals received from the corresponding plurality of sensors.

7. The method of claim 1, wherein the fiber optic links are substantially the same length.

8. The method of claim 1, further comprising calibrating the fiber optic links at each sensor of the plurality of sensors for effective run length equalization.

9. A system for communicating between distributed automotive sensors, comprising:
   a central node coupled to a plurality of fiber optic links, the central node including:
      a node transceiver configured to, via the plurality of fiber optic links, receive a plurality of synchronization (SYNC) signals, transmit a master SYNC signal, and receive synchronized sensor data, and
      a processor configured to determine a master SYNC signal based on the received plurality of SYNC signals, and transmit the master SYNC signal; and
   a plurality of sensors, each sensor coupled to a corresponding fiber optic link of the plurality of fiber optic links, each sensor including a sensor transceiver configured to, via the corresponding fiber optic link, transmit a SYNC signal of the plurality of SYNC signals, receive the master SYNC signal, and transmit sensor data synchronized in accordance with the master SYNC signal.

10. The system of claim 9, wherein the central node is further configured to:
    receive the synchronized sensor data via at least two of the plurality of fiber optic links;
    aggregate the synchronized sensor data; and
    transmit the aggregated sensor data.

11. The system of claim 10, wherein the plurality of sensors comprise two or more radar sensors, and the sensor data are radar sensor data.

12. The system of claim 11, further comprising a computing platform, the computing platform configured to:
    receive the aggregated radar sensor data; and
    determine an angular position for at least one object within the detection range of at least two radar sensors of the plurality of radar sensors.

13. The system of claim 9, wherein:
    each SYNC signal is generated at each sensor using a voltage controlled oscillator (VCO).

14. The system of claim 9, wherein:
    determining a master SYNC signal includes arbitrating among the plurality of SYNC signals received from the corresponding plurality of sensors.

15. The system of claim 9, wherein the fiber optic links of the plurality of fiber optic links are substantially the same length.

16. The system of claim 9, wherein the fiber optic links at each sensor of the plurality of sensors are calibrated for effective run length equalization.

17. The system of claim 9, wherein each sensor of the plurality of sensors further includes a fiber optic interface coupled to the corresponding fiber optic link.

18. The system of claim 9, wherein the central node further comprises a fiber optic interface coupled to the plurality of fiber optic links.

19. The system of claim 9, wherein the sensor transceiver is further configured to transmit and receive configuration and status data.

20. An apparatus for communicating between distributed automotive sensors, comprising:
   means for transmitting, at each sensor of a plurality of sensors, a synchronization (SYNC) signal, each SYNC signal transmitted via a fiber optic link corresponding with each sensor;
   means for receiving, at a central node, the SYNC signals via the fiber optic links corresponding with each of the plurality of sensors;
   means for determining, at the central node, a master SYNC signal based on the received SYNC signals;
   means for transmitting, at the central node, the master SYNC signal via the fiber optic links to the plurality of sensors;
   means for receiving, at each sensor, via the fiber optic link, the master SYNC signal; and
   means for transmitting, at each sensor, via the corresponding fiber optic link, synchronized sensor data synchronized in accordance with the master SYNC signal.

21. The apparatus of claim 20, further comprising, at the central node:
   means for receiving the synchronized sensor data via the fiber optic links corresponding with each of the plurality of sensors;
   means for aggregating the synchronized sensor data; and
   means for transmitting the aggregated sensor data.

22. The apparatus of claim 21, wherein the sensors comprise radar sensors, and the sensor data comprise radar sensor data.

23. The apparatus of claim 22, further comprising, at a computing platform:
   means for receiving the aggregated radar sensor data; and
   means for determining an angular position for at least one object within the detection range of at least two radar sensors of the plurality of radar sensors.

24. The apparatus of claim 20, wherein:
   each SYNC signal is generated at each sensor using voltage controlled oscillator (VCO) means; and
   said means for determining includes means for arbitrating among the plurality of SYNC signals received from the plurality of sensors.

25. The apparatus of claim 20, wherein the fiber optic links are substantially the same length.

26. The apparatus of claim 20, wherein the fiber optic link at each sensor of the plurality of sensors is calibrated for equalization.

27. A non-transitory computer-readable storage medium comprising code, which, when executed by a processor on a central node of a system of distributed automotive sensors, causes an aggregation of synchronized automotive sensor data, the non-transitory computer-readable storage medium comprising:
   code for receiving:
      a plurality of synchronization (SYNC) signals, each SYNC signal received from one of a plurality of sensors, and
      synchronized sensor data from the plurality of sensors, the sensor data synchronized in accordance with a master SYNC signal;
   code for determining the master SYNC signal based on the plurality of received SYNC signals; and
   code for transmitting the master SYNC signal via the plurality of optical links to the plurality of sensors.

28. The non-transitory computer-readable storage medium of claim 25, wherein the synchronized sensor data are received via at least two of the plurality of fiber optic links; and further comprising code for:
   aggregating the received synchronized sensor data; and
   transmitting the aggregated sensor data.

29. The non-transitory computer-readable storage medium of claim 26, wherein the plurality of sensors includes a plurality of radar sensors, and the sensor data are radar sensor data.

30. The non-transitory computer-readable storage medium of claim 25, wherein:
   each SYNC signal of the plurality of SYNC signals is generated at each corresponding sensor using a voltage controlled oscillator (VCO); and
   said code for determining a master SYNC signal further comprises code for arbitrating among the plurality of SYNC signals received from the plurality of sensors; and
   further comprising code for transmitting and receiving configuration data and status data.

* * * * *